United States Patent
Von Muenster

(10) Patent No.: US 11,054,298 B2
(45) Date of Patent: Jul. 6, 2021

(54) ANIMAL IDENTIFICATION AND DATA ASSOCIATION

(71) Applicant: Scale Tec, Ltd., Anamosa, IA (US)

(72) Inventor: Nicholas Von Muenster, Anamosa, IA (US)

(73) Assignee: SCALE TEC, LTD., Anamosa, IA (US)

( * ) Notice: Subject to any disclaimer, the term of this patent is extended or adjusted under 35 U.S.C. 154(b) by 131 days.

(21) Appl. No.: 16/351,692

(22) Filed: Mar. 13, 2019

(65) Prior Publication Data

US 2019/0293477 A1  Sep. 26, 2019

Related U.S. Application Data

(60) Provisional application No. 62/648,103, filed on Mar. 26, 2018.

(51) Int. Cl.
| | | |
|---|---|---|
| *G01G 17/08* | (2006.01) | |
| *G01G 23/26* | (2006.01) | |
| *A01K 11/00* | (2006.01) | |
| *G01G 23/36* | (2006.01) | |

(52) U.S. Cl.
CPC ............ *G01G 17/08* (2013.01); *A01K 11/006* (2013.01); *G01G 23/36* (2013.01)

(58) Field of Classification Search
CPC ....... G01G 17/08; G01G 23/36; A01K 11/006
See application file for complete search history.

(56) References Cited

U.S. PATENT DOCUMENTS

| | | | | |
|---|---|---|---|---|
| 4,475,481 A | * | 10/1984 | Carroll | G06K 7/0008 119/51.02 |
| 4,617,876 A | | 10/1986 | Hayes | |
| 4,718,374 A | * | 1/1988 | Hayes | A01K 11/006 119/655 |
| 7,129,423 B2 | | 10/2006 | Baarsch et al. | |
| 9,226,481 B1 | | 1/2016 | Paripati | |
| 2016/0366858 A1 | | 12/2016 | Seltzer et al. | |

* cited by examiner

*Primary Examiner* — Randy W Gibson
(74) *Attorney, Agent, or Firm* — Shuttleworth & Ingersoll, PLC; Jason R. Sytsma

(57) ABSTRACT

A scale controller is in communication with a weighing scale for receiving a weight signal, translating the weight signal into a weight for the animal, receiving a wireless identification signal from a transmitter on the animal, translating the wireless identification signal into an animal identification value, associating the weight of the animal with the animal identification value, and transmitting to a data storage unit a data packet containing the weight of the animal and the animal identification value.

12 Claims, 4 Drawing Sheets

ANIMAL IDENTIFICATION AND DATA ASSOCIATION

CROSS-REFERENCE TO RELATED APPLICATIONS

The present application claims the benefit of U.S. Provisional Application No. 62/648,103 filed Mar. 26, 2018, the contents of which are incorporated herein by reference.

TECHNICAL FIELD

The present invention relates to the field of management of livestock such as cows, pigs, and the like. More specifically, the present invention provides an apparatus and system for identifying and weighing livestock.

BACKGROUND INFORMATION

Livestock producers now feed the livestock in large automated facilities holding literally hundreds or thousands of animals. An important aspect of efficient livestock production is determining the weight of individual animals in a herd. Animals should be shipped for slaughter at their optimal weight. The animal may not grade as well as possible and feed wasting occurs if an animal is fed too long. If fed for too short a time, an animal may again not grade as well, and the chance to add valuable weight to the animal relatively cheaply at the end of the process is lost.

Accordingly, there is a need for an apparatus and system for identifying and weighing livestock.

SUMMARY

In accordance with one aspect of the present invention, disclosed is an animal weighing system. The weighing system comprises of a weighing scale for translating a weight of the animal into a weight signal. A scale controller is in communication with the weighing scale. The scale controller is configured for receiving the weight signal, translating the weight signal into a weight for the animal, receiving a wireless identification signal from a transmitter on the animal, translating the wireless identification signal into an animal identification value, associating the weight of the animal with the animal identification value, and transmitting to a data storage unit a data packet containing the weight of the animal and the animal identification value.

In one implementation, the transmitter on the animal is an active RFID attached to the animal for actively transmitting a wireless identification signal from the animal. The data packet from the active RFID can comprise of a device type, device identification, battery level, firm ware version, and transmit power level. The active RFID can be, for example, a Bluetooth® Low Energy beacon.

In another implementation, the scale controller distinguishes between the wireless identification signal for the animal on the weighing scale and a plurality of other wireless identification signals from a corresponding plurality of animals by a strength of the wireless identification signal for the animal on the weighing scale. The scale controller can measure a strength of the wireless identification signal for the animal and the strength of the other wireless identification signals to identify the wireless identification signal for the animal. An antenna can be used for receiving the wireless identification signal from the animal. A power meter can be used for measuring the strength of the wireless identification signal.

These and other implementations and embodiments will be better understandable when taken together with the drawings and the following detailed description. This summary is intended to provide an overview of certain subject matter of the present patent application. It is not intended to provide an exclusive or exhaustive explanation of the invention. The detailed description is included to provide further information about the subject matter of the present invention.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
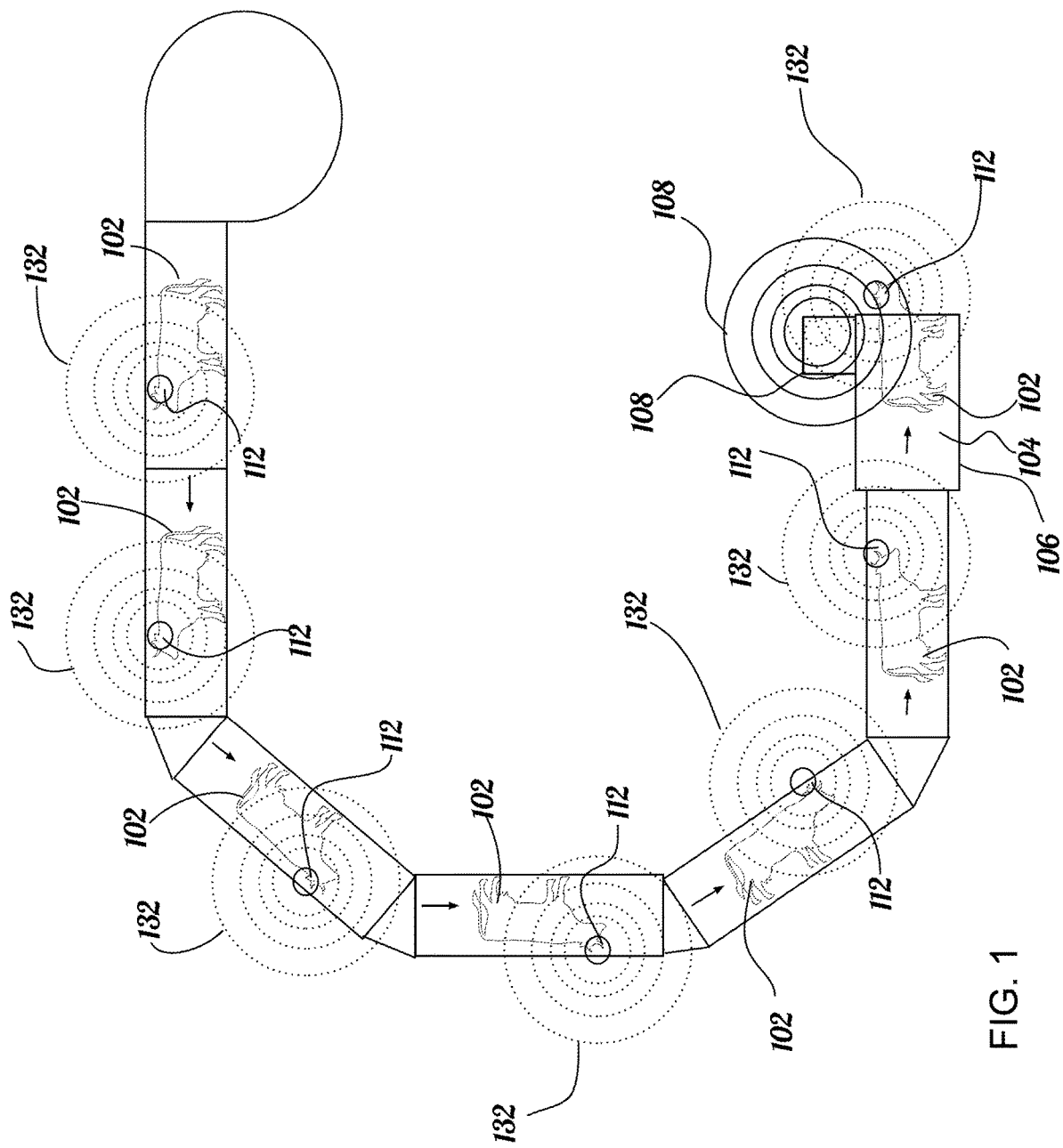
FIG. 1 is a plan view of a representative animal squeeze chute in which the weighing station of the invention may be used.

Referring to FIG. 1, shown is a plan view of a representative animal squeeze chute 104 in which a weighing station 106 according to this disclosure is provided. One or more animals 102 are shown traversing a coral 103 to a squeeze chute 104. Squeeze chute 104 comprises of restraining equipment for holding animals 102 within a confined area to be examined and treated. In this implementation, squeeze cute 104 has an integrated load cell system 106 located beneath squeeze chute 104 to capture the weight of animals 102.

For the purposes of this disclosure, a load cell is a transducer that is used to create an electrical signal whose magnitude is directly proportional to the force being measured. A load cell can include, for example, a hydraulic, pneumatic, and strain gauge or piezoelectric system for measuring the weight of animal 102. Load cell system 106 can be combined to the platform underneath squeeze chute 104 in a fixed orientation to measure the dynamic weight of animal 102.

Figure 2:
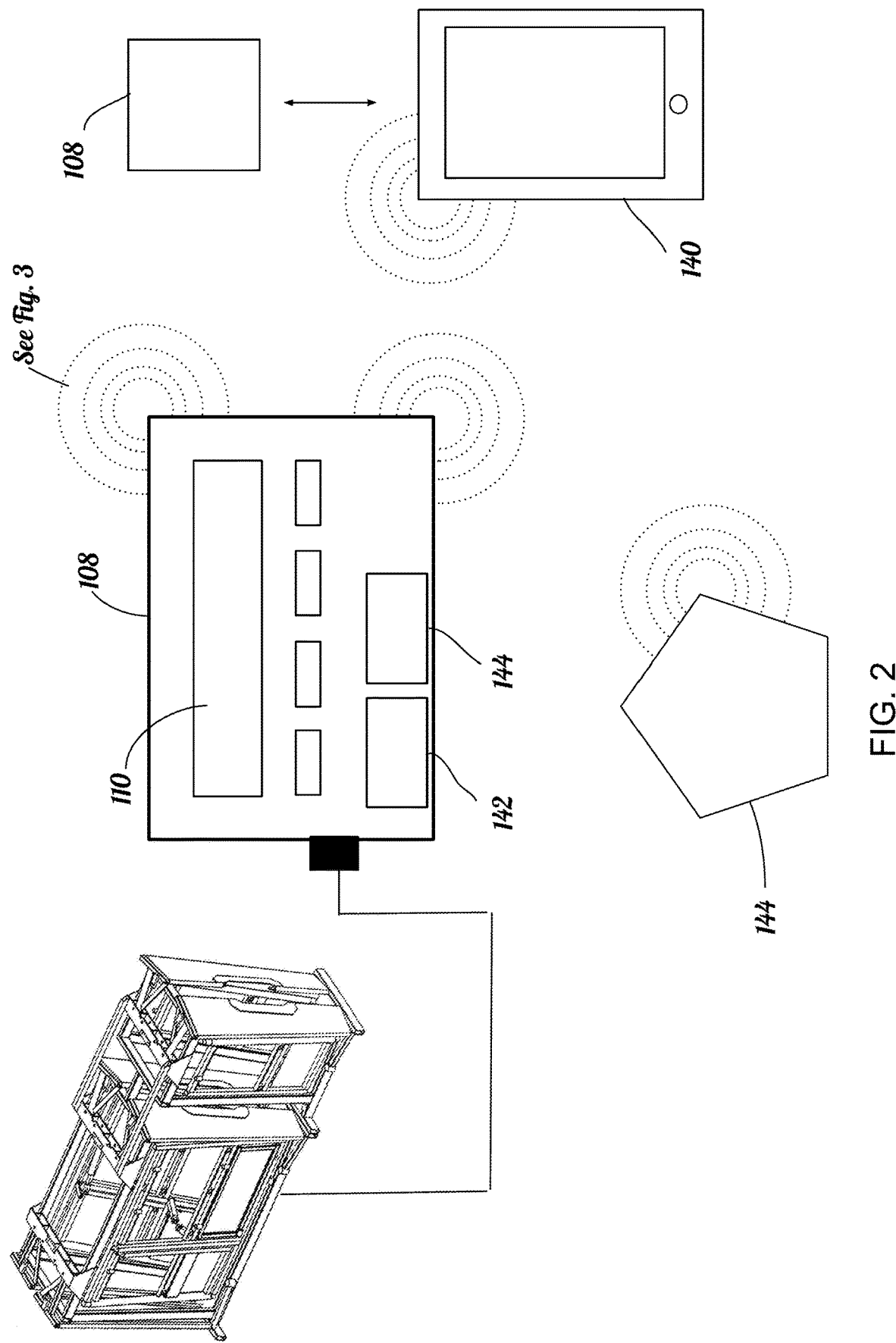
FIG. 2 depicts an exemplary configuration of a system described herein in which a scale-controller detects the animals weight and identification and transmits that information to a data storage unit.

FIG. 2 shows a scale controller 108 comprising a display 110 that is in communication with load cell system 106. Scale controller 108 receives the weight signal from load cell system 106 and translates the weight signal into a weight for animal 102. The weight of the animal can be shown on display 110 or associated with an identification of animal 102 for storage, as discussed below.

Each animal 102 carries its own active radio-frequency identification device (Active RFID) 112. Active RFID 112 broadcasts a unique identification number for animal 102 to uniquely identify animal 102 so that data (such as weight) can be associated with animal 102. Active RFID 112 comprises its own transmitter and power source which distinguishes it from passive RFID devices, such as tags and microchips, in that passive RFID devices which do not have a power source or may have a power source but are energized by an external wand or reader passed in close proximity to energize a capacitor within the passive RFID and discharge an RF signal to the reader for an identification of the tag.

Active RFID 112 can include, for example, Bluetooth® Low Energy beacons. Bluetooth low energy (BLE) is a wireless technology standard for personal area networks. BLE is targeted for very low power devices, i.e. devices that can run on a coin cell battery for months or years. Under an embodiment, Bluetooth enabled beacons/devices may comprise Bluetooth integrated circuit implementations. Updates to embedded code of a Bluetooth enabled device may be accomplished through firmware over the air upgrades. Mobile device operating systems may natively support the Bluetooth low energy wireless communications protocol. Such operating systems include iOS, Android, Windows Phone and BlackBerry, as well as OS X, Linux, and Windows 8.

Figure 3:
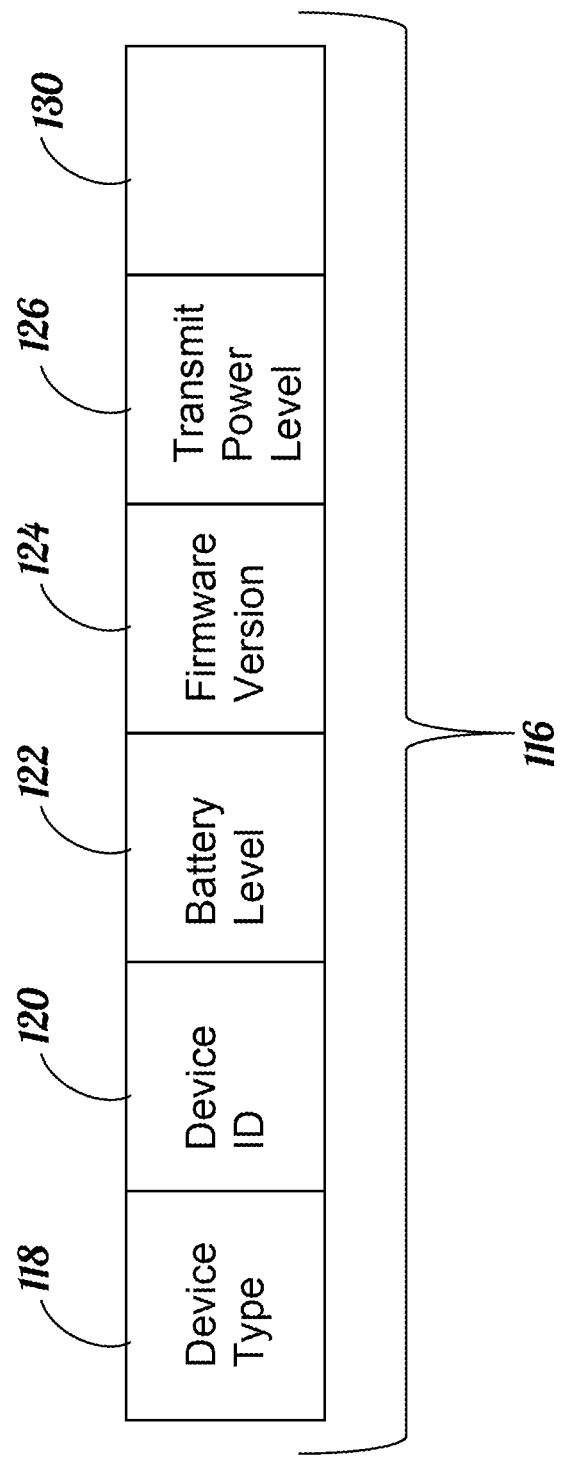
FIG. 3 shows the contents of an RF beacon data packet transmitted from the active RFID on the animal.

FIG. 3 shows the contents of an RF beacon data packet 116 transmitted from active RFID 112 on animal 102 to an antenna associated with scale controller 108. Data packet 116 can include device type 118, device id 120, battery level 122, firmware version 124, and transmit power level 126.

Scale controller 108 comprises of an antenna 142 configured for receiving from Active RFID 112 on animal 102 a wireless identification signal. Scale controller 108 translates the wireless identification signal into an animal identification value. With the unique identification information for animal 102, scale controller 108 associates the weight of animal 102 with its identification value. The identification value can be any alpha-numeric value or symbol. Scale controller 108 may also extract an estimate of the transmission's signal strength (i.e. received signal strength indication or "RSSI"). Scale controller 108 may then use the signal strength to estimate a distance from scale controller 108 to active RFID 112 on animal 102. Scale controller 108 can also comprise a power meter 142 for measuring the strength of the transmission signal for distinguishing among multiple active RFIDs 112. The manner in which this is done is discussed below. The data packet comprising the identification and weight of animal 102 can be transmitted to a data storage unit 114. An exemplary data packet is shown in FIG. 4.

Figure 4:
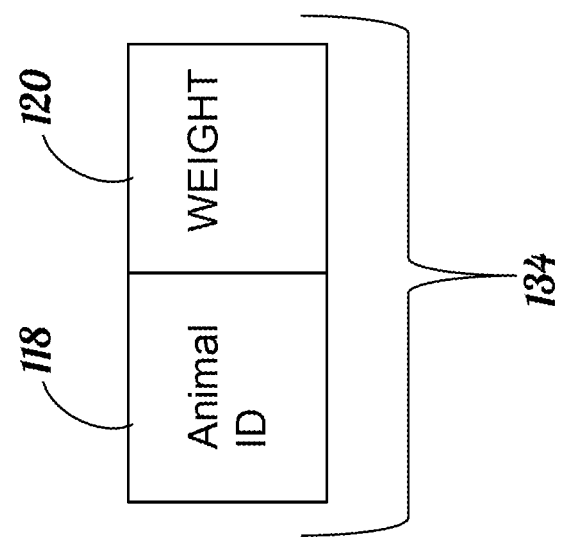
FIG. 4 shows the contents of a data packet transmitted from the scale controller to the data storage unit.

FIG. 4 shows the contents of a data packet 134 transmitted from scale controller 108 to data storage unit 114. Data packet 134 comprises of animal ID 136 and animal weight 138. It should also be noted that data packet 134 can include a number of other characteristics uniquely associated with animal 102, such as sex, birth date, health data, appearance data, etc. The data, such as animal ID 136 and animal weight 138, in data packet 134 is then stored in data storage unit 114 where it can be associated with other data corresponding to animal ID 136.

FIG. 2 also shows a mobile device 140 in communication with one or both of scale controller 108 and data base 114. Mobile device 140 can run a smartphone application communicatively coupled to scale controller 108 through BLE protocol. The smartphone application can also receive data directly from active RFID device 112 or transmit data directly to data base 114. For example, mobile device 114 can be used to photograph animal 102 and send the image to database 114 where it is associated with animal 102 and stored with the weight data.

Returning to FIG. 1, multiple or a plurality of animals 102, each of which has an associated active RFID device 112, make their way around alleyway 103. Each of active RFID devices 112 are actively transmitting identification information, as shown by corresponding wave patterns 132.

Antenna 142 positioned in scale controller 108 (or separately located in squeeze chute 106) receives the identification information from each active RFID device 112. Scale controller 108 identifies which active RFID device 112 is associated with animal 102 in squeeze shoot 106. This can be done in a number of ways, but in the illustrated embodiment, active RFID device 112 having the highest signal strength, as measured by power meter 144, is indicative of active RFID device 112 that is the closest to the antenna according to free-space path loss of an RF signal. An RF signal attenuates in free space in proportion to the distance. This means that the strongest signal is likely coming from the closest active RFID device 112, i.e. the one associated with animal 102 in squeeze chute 104.

One or more components of the systems and methods for associating the weight of animal 102 with its weight can comprise any collection of processor-based devices or computing devices operating together, or components of processing systems or devices, as is known in the art. The processing system in scale controller 108 can include, for example, one or more of a portable computer, portable communication device operating in a communication network, and/or a network server. The portable computer can be any of a number and/or combination of devices selected from among personal computers, personal digital assistants, portable computing devices, and portable communication devices, but is not so limited. The processing system can include components within a larger computer system. In this regard, it should be noted that scale controller 108 can be replaced with mobile device 140. The association of the animal ID with the weight information can be transmitted to mobile device 140 and processed by an associated mobile application where the data is stored in a remote server corresponding with database 114.

The processing system of an embodiment includes at least one processor and at least one memory device or subsystem in scale controller 108. The processing system can also include or be coupled to at least one database, including, but not limited to, database 114. The term "processor" as generally used herein refers to any logic processing unit, such as one or more central processing units (CPUs), digital signal processors (DSPs), application-specific integrated circuits (ASIC), etc. The processor and memory can be monolithically integrated onto a single chip, distributed among a number of chips or components, and/or provided by some combination of algorithms. The methods described herein can be implemented in one or more of software algorithm(s), programs, firmware, hardware, components, circuitry, in any combination.

The components of any system that include the systems and methods of associating an animal id with its weight can be located together or in separate locations. For example, antenna 142 can be located in scale controller 108 or positioned separate from but in close proximity to squeeze chute 104. Antenna 142 can include a series of antennas positioned separate from but in close proximity to squeeze chute 104. Communication paths couple the components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or backend networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages. These communication paths can connect, for example, scale controller 108 with database 114 and mobile device 140.

Aspects of the systems and methods of associating an animal id with its weight and corresponding systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the systems and methods of monitoring a subject in a premises and corresponding systems and methods include: microcontrollers with memory (such as electronically erasable programmable read only memory (EEPROM)), embedded microprocessors, firmware, software, etc. Furthermore, aspects of the systems and methods of monitoring a subject in a premises and corresponding systems and methods may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that any system, method, and/or other components disclosed herein may be described using computer aided design tools and expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of the above described components may be processed by a processing entity (e.g., one or more processors) within the computer system in conjunction with execution of one or more other computer programs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

I claim:

1. An animal weighing system comprising:
   a weighing scale for translating a weight of the animal into a weight signal; and
   a scale controller in communication with the weighing scale configured for:
      receiving the weight signal,
      translating the weight signal into a weight for the animal,
      receiving a wireless identification signal from an active RFID attached to the animal for continuously transmitting a wireless identification signal from the animal without being energized by an external device,
      measuring a strength of the wireless identification signal for the animal and the strength of the other wireless identification signals,
      distinguishing between the wireless identification signal for the animal on the weighting scale and a plurality of other wireless identification signals from a corresponding plurality of animals by a strength of the wireless identification signal for the animal on the weighing scale,
      translating the wireless identification signal into an animal identification value,
      associating the weight of the animal with the animal identification value, and
      transmitting to a data storage unit a data packet containing the weight of the animal and the animal identification value.

2. The animal weighing system of claim 1, wherein the scale controller further comprises of a power meter for measuring the strength of the wireless identification signal.

3. The animal weighing system of claim 1, wherein the scale controller further comprises an antenna for receiving the wireless identification signal from the animal.

4. The animal weighing system of claim 1, wherein the data packet from the active RFID comprises of a device type, device identification, battery level, firm ware version, and transmit power level.

5. The animal weighing system of claim 1, wherein the active RFID is a Bluetooth® Low Energy beacon.

6. A method for animal management, the method comprising:
   receiving a weight signal from a weighing scale;
   translating the weight signal into a weight for an animal;
   receiving a wireless identification signal from a transmitter on an animal, which transmitter is continuously transmitting the wireless identification signal from the animal without being energized by an external device,
   distinguishing between the continuously transmitting wireless identification signal for the animal on the weighting scale and a plurality of other continuously transmitting wireless identification signals from a corresponding plurality of animals by a strength of the wireless identification signal for the animal on the weighting scale;

translating the wireless identification signal into an animal identification value;

associating the weight of the animal with an animal identification value; and transmitting to a data storage unit a data packet containing the weight of the animal and the animal identification value.

7. The method of claim 6, and further comprising measuring a strength of the wireless identification signal for the animal and the strength of the other wireless identification signals to identify the wireless identification signal for the animal.

8. The method of claim 7, and further comprising measuring the strength of the wireless identification signal with a power meter.

9. The method of claim 8, and further comprising receiving the wireless identification signal from the animal with an antenna.

10. The method of claim 6, and further comprising transmitting actively a wireless identification signal from the transmitter on the animal using an active RFID attached to the animal.

11. The method of claim 10, and further comprising sending from the active RFID a data packet comprising a device type, device identification, battery level, firm ware version, and transmit power level.

12. The method of claim 11, wherein the active RFID is a Bluetooth® Low Energy beacon.

* * * * *